May 12, 1970 W. B. WOOD 3,511,010
TWO COMPONENT SEALING SYSTEM FOR PANELS WITH A SUPPORT
Filed Oct. 7, 1968

INVENTOR.
WALTER BRUCE WOOD
BY
Oscar B Brumback
ATTORNEY

United States Patent Office 3,511,010
Patented May 12, 1970

3,511,010
TWO COMPONENT SEALING SYSTEM FOR PANELS WITH A SUPPORT
Walter Bruce Wood, Bridgeville, Pa., assignor, by mesne assignments, to American Air Filter Company, Inc., a corporation of Delaware
Filed Oct. 7, 1968, Ser. No. 765,520
Int. Cl. E04b 5/52
U.S. Cl. 52—393                                              7 Claims

ABSTRACT OF THE DISCLOSURE

A panel for use with a support has a two component sealing means bonded to one of the surfaces of the panel. One component comprises a permanent sealing means extending along and bonded to the perimeter of one of the surfaces of the panel and the other component comprises a releasable sealing means extending along and engaging the permanent sealing means. The releasable sealing means has a first portion bonded to the permanent sealing means and a second portion bondable to the support with a means for releasing the first portion from the second portion of the releasable sealing means, rendering the panel movable from the support.

BACKGROUND OF THE INVENTION

This invention relates to a sealable panel and more particularly to a two-component sealing means where one component comprises a permanent sealing means and where the other component comprises a releasable sealing means.

Particularly, in controlled environment rooms, a plurality of panels are situated in a suspended ceiling and supported upon a plurality of supports. Usually, the panel is an air filter whose function is to remove particulate matter from the air entering the room through the filter. The air filter comprises a filter media peripherally enclosed within a wooden frame for protection and for support of the filter media. The filter media and the frame comprise a sealed unit.

Because of the dimensional irregularities of the wooden frame of the panel, a permanent sealing means, for example, a sealing gasket composed of a resilient, closed-cell rubber or the like, is adhesively bonded to the base of the panel along its perimeter and is engageable with the support to assure a sealed joint between the panel and the support. The sealing gasket comprises a plurality of closed-cells therein. Conventionally, a plurality of clamping devices are disposed at various locations around the panel to urge the panel and the support together to assure that sealed joint between the panel and the support where the sealing means prevents the particulate matter of the air from entering the room therebetween.

Heretofore, when clamping devices were used to secure the air filter to the support, the clamping forces were frequently excessive which caused a break in the seal between the wooden frame of the air filter and the filter media, thus imparing the ability of the filter media to exclude particulate matter from the air entering the room. When leaks in the air filter were discovered, it was necessary to repair the leak by using a suitable caulking compound to patch the leak in the air filter. This repair was costly and highly ineffective because large areas of the filter media were blocked off, thus reducing the capacity of the air filter. In addition, the wooden frame of the filter supported upon the support was continuously submitted to variable stresses caused by temperature changes and movements of the building in which the air filter system was enclosed which again caused breaks in the bond between the filter media and the wooden frame of the filter.

Another problem caused by the use of clamping devices was that the compression of the sealing gasket was not uniform and often the gasket was severely compressed in some regions along the support while in other regions, the gasket was seated improperly. Over a period of time, the ability of the sealing gasket to exclude particulate matter from the air, if the gasket was excessively compressed, deteriorated because of the fracture of the closed-cells within the gasket.

The present invention using a two-component sealing means eliminates the need for clamping devices, prevents the breaking of the seal between the filter media and the frame; eliminates the probability of closed-cell fracture caused by overly compressing the sealing gasket; and greatly facilitates the operation of replacing the air filter, while the two-component sealing means at the same time prevents the leakage of particulate matter between the panel and the support.

SUMMARY OF THE INVENTION

The present invention contemplates a panel for use with a support. The panel has an upper surface and a lower surface with a two-component sealing means comprising one component, a permanent sealing means, extending along and bonded to the perimeter of one of the surfaces of the panel and the other component, a releasable sealing means, extending along and engaging the permanent sealing means. The releasable sealing means has a first portion bonded to the permanent sealing means and a second portion bondable to the support with a means for releasing the first portion and the second portion of the releasable sealing means. The releasable sealing means may be physically separated, rendering the panel movable from the support.

For a further understanding of the invention and for the advantages and features thereof, reference may be made to the following descriptions in conjunction with the drawings which show for the purpose of exemplification various embodiments of the invention.

GENERAL DESCRIPTION OF THE DRAWINGS

DETAILED DESCRIPTION

Figure 1:
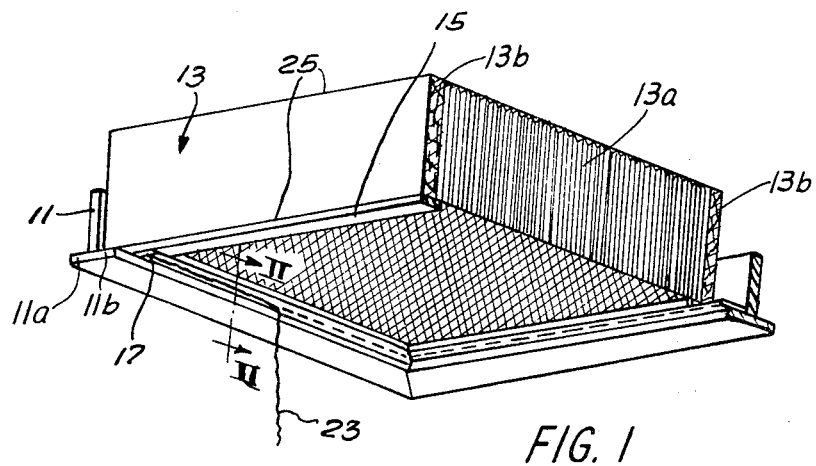
FIG. 1 is an isometric, partially cutaway, view of a panel member resting upon a support and incorporating an embodiment of the present invention.

FIG. 1 illustrates a first embodiment of this invention with a plurality of supports 11 of a suspendable ceiling and a panel member 13. The panel is attached to the support by a two-component sealing means where one component comprises a permanent sealing means 15 and the other component comprises a releasable sealing means 17, with a string-like member 23 attached to the releasable sealing means 17.

The supports 11 are conventionally a component of the suspended ceiling where hangers or the like suspend the supports 11 from the ceiling; however, the present invention may be used either with a suspended ceiling or with a vertical wall comprising supports 11.

The supports 11 generally intersect each other defining a rectangular gridwork. Usually, the supports 11 have flanges (11a and 11b) thereon, on which the panel 13 is supported, defining an inverted T-shaped channel. The invention, as illustrated in FIGS. 1 through 4, shows the panel 13 supported upon an inverted T-shaped channel; however, the present invention may be practiced in a system where the support and filter are inverted, illustrating a T-shaped channel. If the present invention is practiced with the support and panel inverted from those views shown in FIGS. 1 through 4, it is necessary to employ hangers or the like to hold the panel against the support.

The panel 13 is generally rectangular having an upper and lower surface (25) thereon so as to engage one of the flanges (11a or 11b) of the support 11. Typically, the panel 13 is an air filter comprising a suitable filter media (13a) to exclude particulate matter which media (13a) is enclosed within a wooden frame (13b) for support. Those skilled in the art commonly use a HEPA filter (meaning high-efficiency, particulate, air). The HEPA filter is sold by a variety of manufacturers under various trademarks; a typical product air filter is manufactured by American Air Filter Co., Inc. and is sold under the trademark of Astrocel. Manufacturers of the HEPA Filter guarantee an efficiency of 99.93% of the removal of particulate matter from the air passing through the filter. Efficiency of this order of magnitude for an air filter demands that the filter media must be free of flaws or imperfections and impervious to particulate leakage.

In accordance with this invention, the two-component sealing means 15, 17 are likewise impervious to particulate leakage. The two-component sealing means comprises as one component a permanent sealing means 15, and as the other component, a releasable sealing means 17. The permanent sealing means 15 is a gasket composed of a closed-cell material having a plurality of tiny cells therein to prevent particulate leakage therethrough. Of the many materials that are available closed-cell neoprene rubber excellently excludes particulate matter to a greater extent than solid resilient materials; however, solid materials such as solid rubber may be used for the permanent sealing means. To further prevent particulate leakage, the permanent sealing means 15 is adhesively bonded with a suitable adhesive, to the perimeter of the surface 25 of the panel member 13. The HEPA filter is usually received from the manufacturer with the permanent sealing means 15 adhesively bonded to the panel member 13. Because the present invention does not require the use of air filters, any suitable panel where little or no particulate leakage between the joint of the panel 13 and the support 11 is required, can be used with the present invention.

The permanent sealing means 15 serves two purposes. First, the permanent sealing means prevents the leakage of particulate matter of the air from passing between the panel and the support. Secondly, the permanent sealing means 15 insures a proper seating of the panel 13 with the support 11, especially when there are dimensional irregularities in the wooden frame 13b of the panel. As is well known in the art, the dimensional irregularities of the frame 13b of the panel inhibit a flush, sealed joint between the panel 13 and the support 11. Hence, the permanent sealing means 15 excellently serves a dual purpose of excluding particulate matter and assuring a good seal between the panel 13 and the support 11.

As suggested earlier, the principal advantage of using a closed-cell material is its compressibility and its ability to conform to the dimensional variations between the wooden frame 13b of the panel 13 and the support 11 thereby assuring a sealed joint therebetween. One disadvantage, however, of the closed-cell material is its shear strength. When the closed-cell material is bonded with an adhesive to the support 11, the shear strength of the adhesive bonds is greater than the shear strength of the closed-cell material. Hence, when a panel 13 with a permanent sealing means 15 composed of a closed-cell material is removed from the support to which it is bonded, fragments of the closed-cell material adhere to the support whereby an irregular surface is imparted. In order to form a sealed joint between the permanent sealing means 15 of a replacing panel 13 and the support 11, it is necessary to remove those fragments of the closed-cell material, a time consuming and costly operation, so that the replacing panel with its permanent sealing means fits flush with the support 11 to assure the sealed joint.

To prevent fragments of the permanent sealing means 15 from adhering to the support 11 upon the removal of the panel member 13 therefrom the releasable sealing means 17 such as a gasket extends along the permanent sealing means 15 to provide the means for releasing the permanent sealing means 15 from the support 11. The releasable sealing means 17 has a first portion 19 and a second portion 21 where the first portion 19 is adhesively bonded to the permanent sealing means 15 and where the second portion 21 is bonded with an adhesive to the support 11. This arrangement provides a channel generally V-shaped in cross-section having two legs and an apex as shown in FIG. 2.

The preferred cross-sectional shape of the releasable sealing means is V-shaped; however, other shapes can be invisioned with this invention, for example W-shaped or I-shaped. For better results, the releasable sealing means 17 should have a thin cross-sectional thickness so that the second portion 21 may remain on the support 11 after the releasable sealing means 17 is physically separated and the panel 13 is removed therefrom.

The releasable sealing means 17 must be composed of a non-shedding material; the expression non-shedding being an expression commonly used by those skilled in the art. In this invention, non-shedding means a material which over a period of time, does not shed or cast off fragments of its material which would impair the ability of the releasable sealing means 17 to exclude particulates from the air. In addition, the releasable sealing means 17 must be composed of a material which is impervious to particulate matter of the air such as thin, solid rubber, paper, cardboard, and the like. If paper is used, then it should be treated with a resin-like material to prevent shedding as hereinbefore described.

Figure 2:
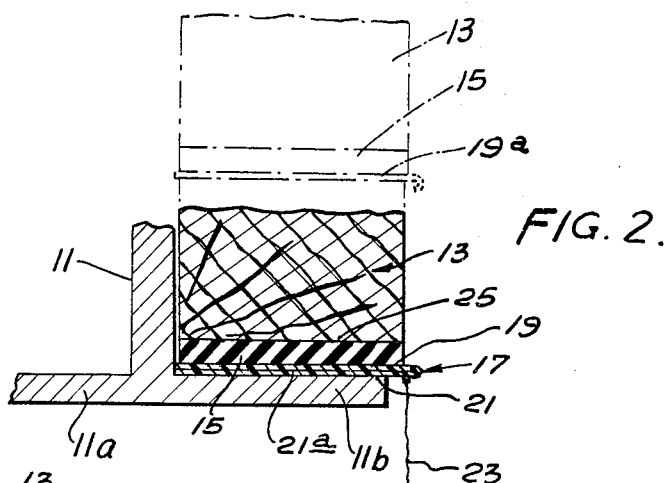
FIG. 2 is a cross-sectional view of FIG. 1 at line II—II where the phantom lines indicate that the panel member has been removed from the supporting member.

The string-like member 23 as shown in FIGS. 1 and 2 is attached to the V-shaped channel of the releasable sealing means 17 and extends lengthwise along the apex end of the V as seen in FIGURE 1. The function of the string-like member 23 is to sever the first portion 19 and the second portion 21 of the releasable sealing means 17 by pulling the string-like member across the thickness of the releasable sealing means 17, whereby the first and second portions are physically separated rendering the panel 13 releasable from the support 11.

In some instances, it is not necessary to include the permanent sealing means 15 with this invention when the surface 25 of the panel 13 does not have dimensional irregularities. Thus, in the second embodiment of the invention, only the releasable sealing means 17 is adhesively bonded to the lower surface 25 of the panel 13. The first portion 19 of the releasable sealing means 17 is adhesively bonded to the perimeter of the surface 25 of the panel 13 and the second portion 21 of the releasable sealing means 17 is adhesively bondable to the support 11. A string-like member or the like is attached to the V-shaped channel of the releasable sealing means 17 and extends lengthwise along the apex end of the V.

In this embodiment, it is essential that the first portion 19 of the releasable sealing means and the second portion 21 of the releasable sealing means 17 are bonded with an adhesive to their counterparts, which adhesive is, likewise, impervious to the leakage of particulate matter.

Figure 3:
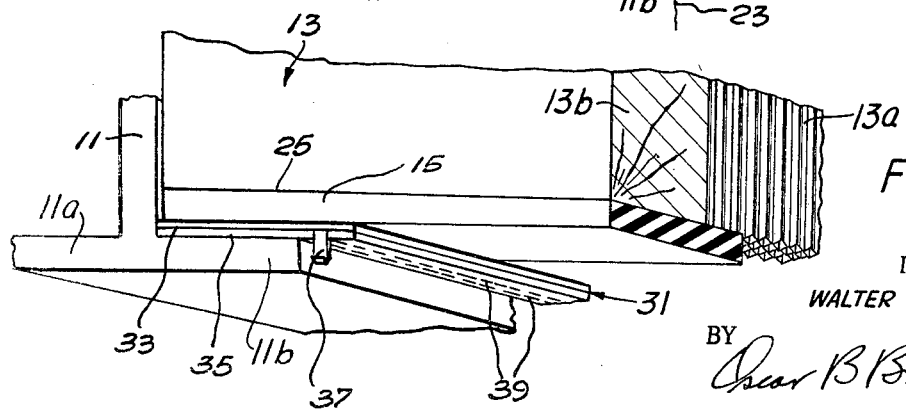
FIG. 3 is an isometric view of a panel member resting upon a support illustrating another embodiment of the present invention.

A third embodiment of the invention is illustrated in FIG. 3. In this embodiment, the releasable sealing means 31 has a first portion 33 and a second portion 35 which define a channel having a V-shaped cross section. The first portion 33 of the releasable means is adhesively bonded to either the permanent sealing means 15 as shown in FIG. 3 or to the perimeter of the surface 25 of the panel member 13 (not shown in the figures) while the second portion 35 is adhesively bonded to the support 11. A tear strip 37 is defined by two substantially parallel scored lines 39 which do not cut through the releasable sealing means 31. The tear strip 37 is integral with either the first portion 33 or the second portion 35 of the releasable sealing means 31 and extends along the length of the channel near the apex end of the V.

Figure 4:
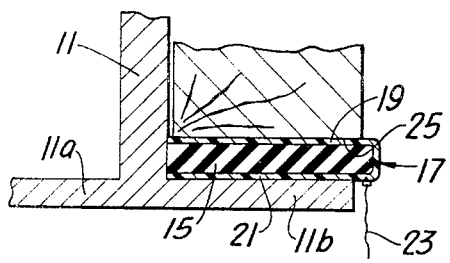
FIG. 4 is a cross-sectional view of the present invention, illustrating another embodiment of the present invention.

A fourth embodiment of the invention is illustrated in FIGURE 4. In this embodiment, the releasable sealing means 17 has a first portion 19 adhesively bonded to the perimeter of the surface 25 of the panel 13, while the second portion 21 of the releasable sealing means 17 is adhesively bondable to the support 11. Interposed between the first portion 19 and the second portion 21 of the releasable sealing means 17 is the permanent sealing means 15, as illustrated in FIG. 4. A string-like member 23 is attached to the V-shaped channel of the releasable sealing means 17 and extends likewise along the apex end of the V. It is to be noted that either the releasable sealing means 17 of FIG. 1 or the releasable sealing means 31 of FIG. 3 may be employed in this fourth embodiment of the invention.

To install the panel 13 using the preferred first embodiment of this invention of FIGS. 1 and 2, the panel is received from the manufacturer with the permanent sealing means 15 attached to the surface 25 of the panel member 13. The first portion 19 of the releasable sealing means 17 may be adhesively bonded to the permanent sealing means 15 by the manufacturer or adhesively bonded to the permanent sealing means 15 at the job location. The releasable sealing means 17 may comprise an elongated channel which can be cut to the proper length at the job site to fit between the panel 13 and the support 11. The assembly comprising the panel member 13, the permanent sealing means 15, and the releasable sealing means 17 is positioned upon the support 11 where the releasable sealing means 17 engages the support 11. The second portion 21 of the releasable sealing means 17 is bondable to the support 11 with the string-like member 23 readily accessible for severing the releasable sealing means 17.

After a period of time, it is necessary to remove the panel 13 and replace it with a new panel. To accomplish this operation, the string-like member 23 of the releasable sealing means 17 is pulled to sever the thickness of the releasable sealing means, thereby rendering the first portion 19 of the releasable sealing means physically separated from the second portion 21 of the releasable sealing means 17. The phantom lines of FIG. 2 illustrate that the panel 13 can easily be removed from the support 11 when the releasable sealing means 17 is severed.

After the releasable sealing means 17 is severed, the old first portion 19a of the releasable sealing means adheres to the permanent sealing means 15 of the old panel 13 and the old second portion 21a of the releasable sealing means remains adhered to the support 11, thereby rendering a smooth surface along the support 11. The old panel assembly is then discarded. A new panel assembly comprising a new panel 13, a new permanent sealing means 15, and a new releasable sealing means 17, is positioned upon the support 11 on top of the old second portion 21a of the releasable sealing means from the old panel. The new second portion 21 of the new releasing sealing means is bondable to the old first portion 21a of the releasable sealing means, thereby eliminating the necessity of removing the old second portion 21a of the releasable sealing means from the support 11. This sequence of operations may be repeated many times without impairing the ability of the two component sealing system to exclude particulate leakage until the build-up of the remaining second portions 21a of the releasable sealing means is excessive.

The second embodiment of this invention where the releasable sealing means 17 is adhesively bonded to the perimeter of the surface 25 of the panel 13 and is bondable to the support 11 can be installed and removed in a similar fashion.

In the third embodiment of the invention using the releasable sealing means 31 having the tear strip 37 as shown in FIG. 3, the first portion 33 of the releasable sealing means is adhesively bonded to the permanent sealing means 15 either by the manufacturer of the panel 13 or at the job site. The panel assembly comprising the panel 13, the permanent sealing means 15, and the releasable sealing means 31 is positioned upon the support 11. The second portion of the releasable sealing means 35 is bondable to the support 11 where the tear strip 37 is exposed for its intended operation.

To remove the panel assembly from the support, the tear strip 37 is pulled along the scored lines 39, causing a physical separation of the first portion 33 and the second portion 35 of the releasable sealing means 31. The panel assembly is then removed from the support whereby the first portion 33 of the releasable sealing means remains adhesively adhered to the permanent sealing means 15 and the second portion of the releasable sealing means 35 adheres to the support, thereby rendering a smooth surface upon the support 11. The old panel assembly is then discarded. The new panel assembly comprising a new panel 13, a new permanent sealing means 15, and a new releasable sealing means 31, is positioned upon the support 11 on top of the old second portion 35 of the releasable sealing means from the old panel. The new second portion 35 of the new releasable sealing means is bondable to the old second portion 35 of the releasable sealing means remaining on the support 11. These operations can be repeated many times without impairing the ability of the novel sealing system to exclude particulate leakage until the buildup of the remaining second portions 21 of the releasable sealing means is excessive.

It should be noted that when the permanent sealing means 15 is not required then the releasable sealing means 31 is used. The panel 13 with only the releasable sealing means 31 is then installed and removed in a similar fashion as herebefore described.

The fourth embodiment of the invention where either releasable sealing means 17 or 31 is adhesively bonded to the perimeter of the surface 25 of the panel 13 and is bondable to the support 11 with the permanent sealing means 15 interposed therebetween can be installed and removed in a similar fashion as it is hereinbefore described.

Thus, this invention of the novel sealing means with the releasable features eliminates the need for clamping devices to secure the panel to the support; overcomes the problem of inter-cell fracture of the closed-cell gasket of the permanent sealing means; provides a method for the quick and easy removal of panels which are bondable to the supports while maintaining at the same time a sealed joint between the panel and the support.

What is claimed is:
1. A panel having an upper and a lower surface and a two component sealing means comprising:
   one component, a permanent sealing means, extending along and bonded to the perimeter of one of the surfaces;
   the other component, a releasable sealing means, extending along and engaging the permanent sealing means and engageable with a support;
   said releasable sealing means having a first portion bonded to the permanent sealing means and a second portion susceptible of bonding to the support; and
   a means for releasing the first portion from the second portion of the releasable sealing means, rendering the panel movable from the support.

2. A panel having an upper and a lower surface comprising:
- a releasable sealing means extending along and engaging the perimeter of one of the surfaces and engageable with a support;
- said releasable sealing means having a first portion bonded to one of the surfaces of the panel and a second portion for bonding to the support; and
- a means for releasing the first portion from the second portion of the releasable sealing means, rendering the panel movable from the support.

3. A panel having an upper and lower surface and a two-component sealing means comprising:
- (a) one component, a releasable sealing means, extending along and engaging the perimeter of one of the surfaces of the panel and engageable with a support;
- (b) said releasable sealing means having a first portion bonded to one of the surfaces of the panel and a second portion for bonding to the support;
- (c) the other component a permanent sealing means interposed between the first portion and the second portion of the releasable sealing means;
- (d) a means for releasing the first portion from the second portion of the releasable sealing means rendering the panel movable from the support.

4. The structure of claim 1, wherein said releasable sealing means comprises:
- a channel, generally V-shaped in cross-section, with one leg of the V bonded to the permanent sealing means and the other leg for bonding to the support; and
- a string-like member attached to the channel and extended length-wise along the channel near the apex end of the V for severing one leg from the other leg whereby the legs are physically separated, rendering the panel movable from the support.

5. The structure of claim 2, wherein said releasable sealing means comprises:
- a channel, generally V-shaped in cross-section, with one leg of the V bonded to one of the surfaces of the panel and the other leg for bonding to the support; and
- a string-like member attached to the channel and extended lengthwise along the channel near the apex end of the V for severing one leg from the other leg whereby the legs are physically separated, rendering the panel movable from the support.

6. The structure of claim 1, wherein said releasable sealing means comprises:
- a channel, generally V-shaped in cross-section, with one leg of the V bonded to the permanent sealing means and the other leg for bonding to the support; and
- a tear strip integral with one of the legs, and extending lengthwise along the channel near the apex end of the V for severing one leg from the other leg whereby the removal of the tear strip causes a physical separation of the legs, rendering the panel movable from the support.

7. The structure of claim 2, wherein said releasable sealing means comprises:
- a channel, generally V-shaped in the cross-section, with one leg of the V bonded to one of the surfaces of the panel and the other leg bondable to the support; and
- a tear strip integral with one of the legs, and extending lengthwise along the channel near the apex end of the V for severing one leg from the other leg whereby the removal of the tear strip causes a physical separation of the legs, rendering the panel movable from the support.

References Cited
UNITED STATES PATENTS

| | | | |
|---|---|---|---|
| 3,020,587 | 2/1962 | Alderfer et al. | 52—403 X |
| 3,350,862 | 11/1967 | Nutting | 52—494 X |

PRICE C. FAW, JR., Primary Examiner

U.S. Cl. X.R.

52—403, 494